Feb. 12, 1952  D. SILVERMAN  2,585,412
WELL PRODUCTIVITY LOGGING
Filed April 29, 1950
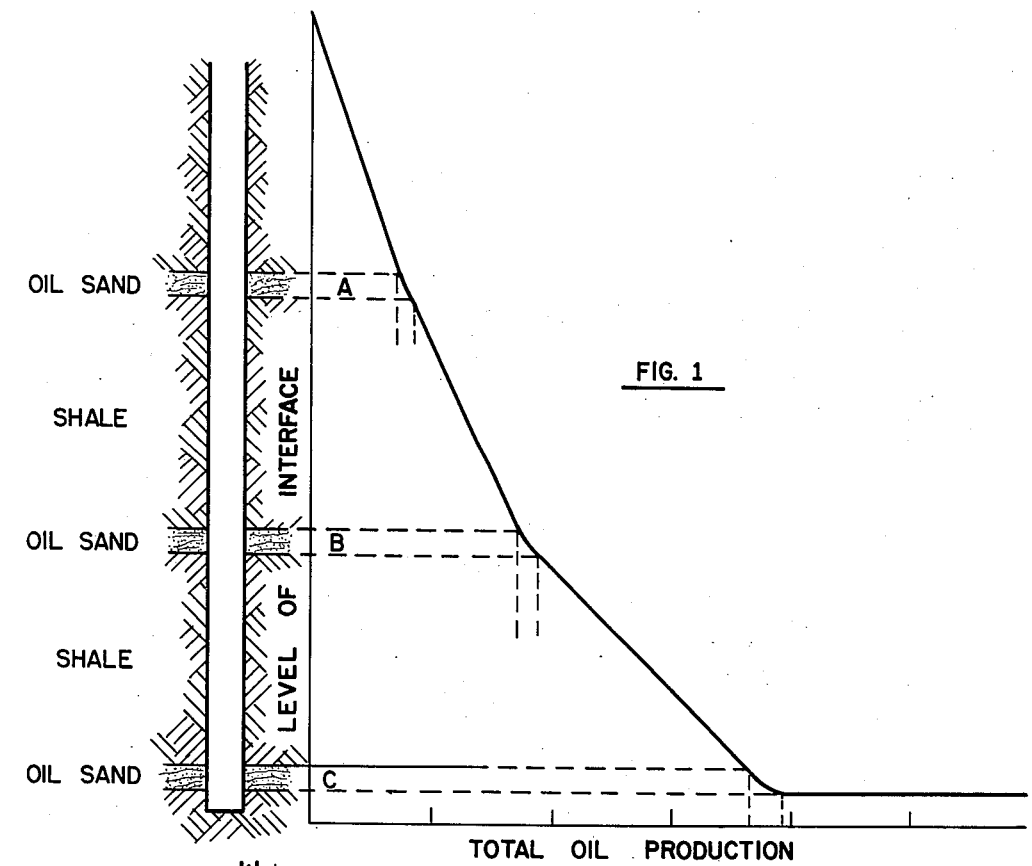
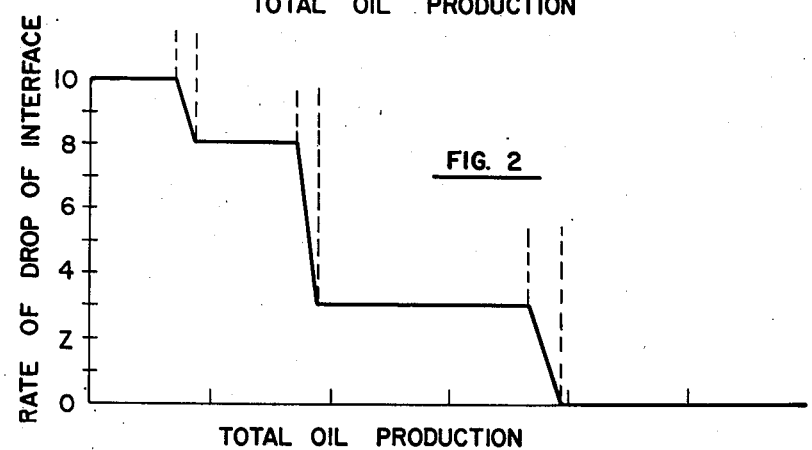
DANIEL SILVERMAN
INVENTOR.
BY
ATTORNEY Patented Feb. 12, 1952

2,585,412

UNITED STATES PATENT OFFICE 2,585,412

WELL PRODUCTIVITY LOGGING

Daniel Silverman, Tulsa, Okla., assignor to Stanolind Oil and Gas Company, Tulsa, Okla., a corporation of Delaware Application April 29, 1950, Serial No. 158,950

7 Claims. (Cl. 23—230)

The present invention relates to a method of logging wells to determine the liquid productivity thereof and, more particularly, to a method for determining the location of oil-producing formations as well as the quantity of oil being produced therefrom. As to common subject matter, this is a continuation in part of my copending application Serial No. 490,163, filed June 9, 1943, now abandoned.

It is an object of the present invention to provide a method for determining the location of zones in a well at which oil is produced. Likewise, it is an object of the present invention to provide a method for determining those zones in the well which produce the largest amounts of oil, whereby the over-all production is rendered more efficient and economical. It is another object of the present invention to obtain the abovementioned results by means of a simple and economical method and apparatus. Other objects of the present invention will be apparent from the following description, where reference will be made to the accompanying drawings, in which:

Figure 1 is a typical well log obtained by my process, showing the position of an interface in a well relative to the amount of oil produced, and Figure 2 is a curve based on the well log shown in Figure 1, showing the rate of drop of that log and the relative oil productivity of the various oil sands.

In its broader aspects, the present invention involves the use of a selective solvent, i. e., a solvent which will form two phases with the oil in the well: a light, or solvent-in-oil, phase; and a dense, or oil-in-solvent, phase. The selective solvent produces in the well one or more interfaces between dissimilar fluids. This interface may be located and followed by means well known in the art. Movement of the interface in a well is then indicative of the location and productivity of oil-producing formations.

To carry out the present invention, it is necessary to obtain a selective solvent for oil having a specific gravity greater than that of the brine which is found in the particular well to be logged. Also, the selective solvent must be only partially soluble in oil and the oil must be only partially soluble in the solvent. That is, the solvent and the oil in the well must be capable of forming both solvent-in-oil and oil-in-solvent phases. It is well known that, when oil is added to a selective solvent, some of the oil will be dissolved in the solvent, forming a homogeneous mixture, the oil-in-solvent phase, until the mixture obtains a particular ratio of oil to solvent. When additional oil is added, so that this ratio is exceeded, a second phase or solvent-in-oil phase tends to form, in which the selective solvent is dissolved in the oil. This last-mentioned phase will have a lower specific gravity than the oil-in-solvent phase and will rise in the oil-in-solvent phase. The solvent-in-oil phase for the selective solvent also should have a specific gravity less than the brine in the well. While a selective solvent having a specific gravity much greater than that of the brine may be used, it has been found expedient and time saving to adjust the composition of the solvent by adding oil thereto to form a saturated oil-in-solvent phase, so that when production is started additional oil will not be dissolved in the solvent, and the solvent-in-oil phase will be formed immediately. If pure solvent is introduced into the well, a substantial period of time must elapse while the oil is dissolving in the solvent to form the oil-in-solvent phase before the critical ratio of oil-in-solvent is reached. During this period of time, the interface between the solvent and brine will rise, due to the increased volume. However, as soon as the solvent-in-oil phase begins to form and pass upwardly through the solvent and the brine, the interface between the brine and oil-in-solvent phase will start to drop.

In the present specification and in the appended claims, the term "solvent" will be used to denote either a pure selective solvent or a selective solvent which has already been mixed with oil to form an oil-in-solvent phase, as mentioned hereinbefore. Usually, the solvent which is selected will have a higher electrical resistivity than the brine, and, if this is the case, the location and rate of drop of the interface may be determined by the use of a pair of electrodes, as is well known in the art. See, for example, U. S. Patent 2,413,435, Courter. Obviously, other means may be used for detecting the location and rate of drop of the interface which do not rely upon electrical characteristics of the brine and oil-in-solvent phase. For example, a float or the like of intermediate density between the brine and solvent may be used for this purpose.

Various selective solvents may be used for carrying out the present invention, such as nitrobenzene, chlorex, 2-nitropropane, furfural, and the like. Obviously, the particular solvent must be selected in the light of the characteristics of the particular well being tested. Several factors must be taken into consideration in selecting the solvent, since a solvent which is entirely suitable for one well may not prove suitable in other wells; for example, the specific gravity of the brine in the well being tested, the bottom-hole temperatures, and the particular type of oil which is being produced must be considered.

After the selection of a suitable solvent, it is introduced into the well so that it will fill the well from the bottom thereof to a point above the highest oil-producing formation. This solvent will replace the brine which is located at the bottom of the well, and an interface therebetween will be formed. In case there is no brine in the well, it may be desirable to add a small amount of water or some other liquid, such as alcohol or the like, which is not miscible with the solvent or the oil and which can be distinguished, as by electrical conductivity, specific gravity, light transparency, or the like, from the solvent, to facilitate the location of the top of the oil-in-solvent phase. The device for locating the interface and for determining the rate of drop of the interface may then be lowered into the well and the location of the interface determined and followed, as, for example, by the process described in said U. S. Patent 2,413,435. Production of the well is then initiated so that oil will be produced from the oil-bearing formations. As the oil enters the well, it will form with the selective solvent the oil-in-solvent phase. During this time, the interface may rise slightly, due to increased volume. However, when the critical ratio has been reached and the solvent-in-oil phase begins to form, this phase, being of lower specific gravity than the brine, will pass upwardly therethrough, causing the interface to drop. Obviously, the rate of drop of the interface at the beginning of the test will be comparatively rapid, since the oil from all of the formations will be producing the solvent-in-oil phase. When the interface drops to a point adjacent the uppermost point of oil entry, the rate of drop of the interface will decrease, because the oil being produced at the uppermost point will pass into the brine rather than into the selective solvent and will flow immediately to the top without forming a solvent-in-oil phase with the solvent. At this point, it will be clear that the concentration of oil in the solvent-in-oil phase will be increased by an increment equal to the oil flowing from the uppermost oil formation. This sequence of events will continue and the rate of drop of the interface will decrease until the interface reaches a point adjacent the lowermost point of oil entry. At this point, the interface will cease to drop further, since below this point there will be no oil entering the solvent to disturb the equilibrium thereof.

Referring now to the drawings, Figure 1 shows a log of the location of the interface between solvent and brine in the well as a function of total oil production. In the case of a uniform rate of production of oil, the abscissa could also represent time. Where the ordinate represents well depth, this log shows the position of the interface between solvent and brine versus total oil production as fluid is withdrawn from the well above the interface and oil flows from oil sands A, B, and C into the well. The rate of drop of the interface, as shown by this log, as a function of time or of total production is shown in Figure 2 and represents the flow at each producing formation. In the case illustrated, the three zones at which flow is shown are considered to be of inconsiderable thickness, acting more or less as point sources of oil. The effect of thicker oil sands would be to wipe out the relatively sharp breaks in the log shown in Figure 1, so that the several straight-line portions would be connected by longer curved sections having an extent in depth equal to the thickness of the corresponding oil sand.

For the condition assumed of relatively thin producing sections, the curve of Figure 2 indicates the productivity of each of the three producing sections by the difference between the two rates of drop when the interface is above and below the producing level. As an example of the interpretation of Figures 1 and 2 and to clarify the invention, assume a situation in which the oil sands A, B, and C are very narrow. Assuming further that there is no production of oil from the shale sections between the thin oil-producing zones A, B, and C, the apparatus as above described is lowered into a well which has been conditioned in accordance with the above description, and the top of the oil-in-solvent phase is located. Production of the well is then commenced, preferably at a substantially constant rate, and the interface between the oil-in-solvent phase and the supernatant brine phase is lowered. Under these conditions, i. e., constant production rate, if the position of the interface is plotted against time (or total oil production from commencement of the test) in volume or weight (preferably in barrels), a log such as that shown in Figure 1 will be produced. Since the change of slope in this log is in some cases difficult to determine, it may be differentiated, as indicated in Figure 2, to indicate the rate of change of interface velocity during the test. Then assuming, as above pointed out, that there is uniform production from each of the zones throughout its total thickness and that there is no production in the shale zone above oil sand A, the rate of change of interface velocity will remain constant down to the top of the first oil-producing sand, i. e., oil sand A. This is indicated quantitatively in Figure 2 in arbitrary units, as 10. The production throughout zone A being uniform, the rate of change of interface velocity as the interface crosses the oil sand will be constant; i. e., there is uniform deceleration of the interface between 10 and 8 units. This difference between 10 and 8 units (2 units) is indicative of the ratio of oil being produced from oil sand A as compared to the oil production from all oil-producing sands (10 units). This drop in the curve is a straight line, since uniform production throughout zone A was assumed. Obviously, in practice, this portion of the curve may assume a different shape, depending upon variations in oil-production rate within the oil sand.

Similarly, the rate of change of interface velocity is zero, and the rate of drop of the interface is constant at 8 units on an arbitrary scale between oil sands A and B, since no fluid enters the well in this shale zone. The curve of Figure 2 is therefore flat during the time the interface descends from the bottom of oil sand A to the top of oil sand B. The slope of the interface log of Figure 1 between oil sand B and oil sand C is substantially lower than the slope of the log between oil sand A and oil sand B. This change in the slope is indicated by the curve in Figure 2 and is quantitatively the difference between 8 units (the rate of drop of the interface above oil sand B) and 3 units (the rate of drop of the interface below oil sand B), or 5 units. Thus, by differentiating the log of Figure 1 or plotting its change in slope, as shown in Figure 2, the relative production from each of the oil sands A, B, and C may be shown in units which are easily interpreted quantitatively. The curve of Figure 2, however, is not necessary, since a close approximation of the relative producing rates of the various oil sands can be obtained by comparison of the slope of the log at different depths.

While the relative oil productivity of the various sands may be established from the above procedure, other methods of obtaining the quantity of oil produced from the various oil sands penetrated by the well may sometimes be desirable. In one alternative method, as in the previously described method, the position of the interface is plotted against total oil production (or against time, assuming constant production rate). In this alternative process, it is desirable to determine, as by distillation, specific gravity, or the like, the percentage of solvent in the solvent-in-oil phase. Assuming an excess of oil-in-solvent phase at the bottom of the well, the percentage of solvent in the solvent-in-oil phase will vary substantially as the interface passes an oil-producing sand. Then, having the position of the interface and the percentage of solvent in that phase versus total oil production, the relative oil production in the sands below and above the interface may be determined, as set out below.

When the oil-in-solvent phase-brine interface is above the top oil sand, all the oil that is produced passes through the oil-in-solvent phase and carries with it a fixed percentage "X" of solvent. For this position of the interface, the percentage of solvent in the solvent-in-oil phase is constant. When the oil-in-solvent phase-brine interface is below an oil-producing sand, the oil produced above said interface passes upward through the brine directly to the solvent-in-oil phase, reducing the percentage of solvent in the solvent-in-oil phase. At the same time, oil produced from zones below the oil-in-solvent phase-brine interface passes upwardly through the solvent, carrying the percentage X of solvent.

In further explanation of this embodiment, let the rate of production of oil from each of the three oil sands A, B, and C be denoted by the letters A, B, and C, respectively. When the oil-in-solvent phase-brine interface is above oil sand A, the rate of removal of solvent from below the interface will be $(A+B+C)X$. Consequently, for this condition of the level of the interface, the percentage of solvent in the solvent-in-oil phase wil be X. When the interface is between oil sand A and oil sand B, the rate of removal of solvent from below the interface is $(B+C)X$. However, the total rate of production will still be $A+B+C$, so that the percentage of solvent "Y" in the produced oil will be $$\frac{X(B+C)}{A+B+C} \quad (1)$$

When the solvent-brine interface is below oil sand A, the oil entering the well from that zone will pass directly up through the brine and be carried to the surface without carrying its proportionate share of solvent. In general terms, we can state, therefore, that if we let "U" represent the oil production above the instantaneous level of the interface and "L" represent the oil production below the instantaneous position of the interface and "Y" be the measured percentage of solvent in the produced oil, we can write $$Y=\frac{LX}{U+L} \quad (2)$$

Solving for U, the rate of oil production above the interface, $$U=\frac{LX}{Y}-L \quad (3)$$

or, dividing by L, $$\frac{U}{L}=\frac{X}{Y}-1 \quad (4)$$

It is possible, therefore, to determine by these alternative processes the relative rates of production above and below the solvent-brine interface at any particular position of the interface, provided only that the percentage of solvent in the oil and the position of the interface are determined and the known solubility of the solvent in the oil is available.

In the event that the formation produces brine as well as oil, it will be desirable to take into consideration the rate of brine production as well as the rate of oil production and to determine (directly or indirectly) the solubility of the solvent in both oil and brine under well conditions. If the quantity of solvent brought up from the well by the brine is substantial with relation to the quantity of solvent brought up by the oil, it will be necessary to analyze either the oil or the brine for percentage of solvent, so that the rate of oil production at various levels can be segregated from the rate of brine production at various levels.

As an example of the operation of this invention, a laboratory test was conducted in which nitrobenzene, having a density of 1.199 g./cc., was used as a conditioning fluid. Lubricating oil (SAE 20), having a density of 0.880 g./cc., was used to simulate produced oil. Tests showed that a saturated solution of lubricating oil in nitrobenzene contained 12 per cent oil by volume and that a saturated solution of nitrobenzene in lubricating oil contained 19.3 per cent nitrobenzene by volume.

The apparatus employed consisted of a 250 ml. graduated cylinder to simulate the well. The lubricating oil was admitted through two tubes terminating at the 133.5 and 44.0 ml. graduations. The cylinder was filled to about 150 ml. with nitrobenzene, and approximately constant oil flow into the solvent was obtained by siphoning the oil from an elevated reservoir through capillary tubes. About 50 ml. of water were placed on top of the nitrobenzene. Transport of the nitrobenzene upwardly by the oil was followed by using the graduations of the cylinder to measure level changes in the water-nitrobenzene interface. Oil flowed from the capillary orifices of the inlet tubes in a continuous filament and series of droplets upwardly to the water-nitrobenzene interface, where it collected as larger drops and passed upwardly through the water.

The test extended over a period of about 14 days. A log of the solvent-water interface showed a sharp break in the rate of fall of the fluid level at the two points of entry of oil. In the test, the level of the interface remained substantially constant while the solubility equilibrium of the oil-in-solvent phase was being established and also after all oil production into the test cylinder was above the solvent-water interface.

Manifestly, the process described is capable of some modification, and such modification as may be construed to fall within the scope and mean-

I claim:

1. A method for determining the location of an oil-producing formation in a well containing brine comprising introducing a brine-immiscible selective solvent into said well to a depth above said formation, said solvent being heavier than said brine, producing an interface therebetween, and forming with the oil from said formation a solvent-in-oil phase lighter than said brine, producing said well to cause said formation to produce oil into said well, and as said well is produced locating the position of said interface with respect to a parameter that varies as the amount of oil produced by said well which position represents a log of said well whereby said oil-producing formation may be located.

2. A method for determining the location and productivity of an oil-producing formation in a well containing a brine comprising introducing a substantially brine-immiscible selective oil solvent into said well to a depth above the lowermost oil-producing formation, said solvent being capable of forming oil-in-solvent and solvent-in-oil phases with the oil flowing into said well, said oil-in-solvent phase having a specific gravity greater than that of the brine in said well, producing said well to cause oil to flow thereinto, and locating the depth of the interface between said oil-in-solvent phase and said brine with respect to a parameter which is a function of total oil produced whereby the location and productivity of said oil-producing formation may be determined.

3. A process of logging an oil well containing a brine to determine the location and productivity of oil-producing formations comprising introducing a substantially brine-immiscible selective solvent into said well to a depth above said oil-producing formations, said solvent being heavier than said brine and being at least partially soluble in the oil in said formations for forming with said oil a solvent-in-oil phase lighter than said brine, producing said well to cause oil to flow thereinto, locating the interface between said brine and said solvent at intervals of time, and analyzing said solvent-in-oil phase to determine the proportion of oil therein, whereby the location of said oil-producing formations and the relative amounts of oil production therefrom may be determined.

4. A process of logging an oil well containing a brine to determine the location and productivity of oil-producing formations comprising introducing a substantially brine-immiscible selective oil solvent into said well in sufficient amounts to fill the well up to a point above the uppermost oil-producing formation, said solvent being capable of forming with oil an oil-in-solvent phase having a specific gravity greater than that of said brine and a solvent-in-oil phase having a specific gravity less than that of said brine, producing the well to cause oil to flow thereinto, locating the depth of the interface between said oil-in-solvent phase and said brine at intervals of time so as to obtain the change in depth of said interface as a function of time, and determining the proportion of oil present in said solvent-in-oil phase, whereby the location of the oil-producing formations and the relative amounts of oil being produced therefrom may be determined.

5. A process of logging an oil well containing a brine to determine the location and productivity of oil-producing formations comprising introducing a substantially brine-immiscible selective oil solvent into said well in sufficient amounts to fill the well up to a point above the uppermost oil-producing formation, said solvent being capable of forming with oil an oil-in-solvent phase having a specific gravity greater than that of said brine and a solvent-in-oil phase having a specific gravity less than that of said brine, producing the well to cause oil to flow thereinto, and making a log of said well by locating the position of the interface between said oil-in-solvent phase and said brine as a function of total oil produced from said well, whereby the location of oil-producing formations in said well will be indicated on said log by changes in slope of said log.

6. A process of logging a well which produces oil to determine the location and productivity of oil-producing formations comprising introducing a first liquid into said well, introducing a selective oil solvent into said well, said solvent being immiscible with and heavier than said first liquid and said solvent being capable of forming a solvent-in-oil phase with said oil, producing said well to cause oil to flow thereinto, and locating the depth of the interface between said first liquid and said solvent as a function of the amount of oil produced by said formations whereby the location and productivity of said oil-producing formations may be determined.

7. A process of logging an oil well containing water to determine the location of oil-producing formations comprising introducing a substantially water-immiscible selective oil solvent into said well to a depth above the lowermost oil-producing formation, said solvent being capable of forming oil-in-solvent and solvent-in-oil phases with the oil flowing into said well, said oil-in-solvent phase having a specific gravity greater than that of the water in said well, producing said well to cause oil to flow thereinto, and locating the depth of the interface between said oil-in-solvent phase and said water with respect to a parameter which varies as a function of total oil produced by said well whereby the location of said oil-producing formations may be determined.

DANIEL SILVERMAN.

No references cited.